Patented Aug. 6, 1935

2,010,034

UNITED STATES PATENT OFFICE 2,010,034

METHOD OF TREATING NORMALLY COLD-MOLDABLE PLASTIC INSULATING COMPOSITIONS

Linwood T. Richardson, Milwaukee, Wis., assignor to Cutler-Hammer, Inc., Milwaukee, Wis., a corporation of Delaware No Drawing. Application November 9, 1933, Serial No. 697,305

8 Claims. (Cl. 18—55)

This invention relates to methods of treating normally cold-moldable plastic insulating compositions.

An object of the invention is to provide novel methods of preparing cold-moldable compositions whereby the surface finish of articles produced therefrom is improved.

Another object is to provide novel methods of preparing and molding normally cold-moldable compositions whereby the surface finish of articles produced therefrom approximates in excellency the finish obtained by hot-molding synthetic resin compositions.

Another object is to provide methods whereby an improved surface finish of the molded articles is obtained without sacrificing any of the known desirable characteristics of cold-molded articles.

Another and more specific object is to provide a method including the step of quick-hot-molding a normally cold-moldable composition.

Other objects and advantages of the invention will hereinafter appear.

In the art of making plastic insulating composition articles there are, in general, two radically different methods of molding employed, namely, the hot-molding method and the cold-molding method. The particular method to be employed is of course determined by the nature and characteristics of the material to be molded,—the hot-molding method being necessitated in the treatment of the various well known synthetic resin compositions, and the cold-molding method being satisfactory and being considered desirable for the treatment of compositions including a bituminous or asphaltic binder. In hot-molding the material is both formed and cured under relatively high pressure in a heated die. In cold-molding the material is quickly formed under relatively high pressure at room temperature in a die also at room temperature, and after removal from the die the parts are subjected to a prolonged heat-treatment in an oven for curing.

Such hot-molded articles inherently possess a natural surface finish which is much superior to the finish of articles produced by the usual cold-molding operation. This is largely due to the fact that the hot die effects a very great increase in plasticity of the material with which it contacts and hence results in the surface of the pressed article being a substantially perfect reverse reproduction of the die surface.

In cold-molding as heretofore practiced the natural surface finish of the molded parts is not so good. The die surfaces and the material are at approximately the same temperature (room temperature), and the short time period of pressure application is not sufficient to allow the material to flow completely against the die surfaces. Moreover, such cold-moldable material contains a substantial percentage of volatile constituents (as, for instance, the solvents employed), and the volatile matter when driven off during the usual prolonged heat-treatment of the molded articles appreciably deteriorates the quality or smoothness of the surface as pressed. Some of these volatile constituents come off at relatively low temperatures.

In the method of semi-hot molding normally cold-moldable plastic insulating composition material as herein contemplated by me the die surfaces are made considerably warmer than the material to be molded, whereas the latter may be and preferably is heated to a temperature substantially above room temperature. Nevertheless it is to be understood that (as compared with cold-molded articles of the prior art) an improved surface finish will be obtained when the die members only are heated and the mold charge is inserted at room temperature. The material when prepared for pressing also has less plasticity than a similar material suitable for cold-molding. The heat in the die members is depended upon to furnish the additional heat necessary to provide the proper molding plasticity. The decreased plasticity of the material is brought about by drying the same in an oven, or by some other similar heat-treatment, which removes a certain proportion of the volatile constituents adapted to evaporate at low temperatures,—thereby eliminating the aforementioned source of surface injury.

The best results will of course be obtained by employment of a non-sticking molding material of the character described and claimed in my co-pending application, Serial No. 697,250, filed on even date herewith. Also I prefer to treat the material before molding by extrusion and blanking thereof in the manner described in my Patent No. 1,944,464 dated January 23, 1934.

A typical non-sticking molding material of the character disclosed in said application, Serial No. 697,250, may include a binder prepared by heating 100 parts by weight of stearin pitch, adding thereto 100 parts of gilsonite and 100 parts of oleic acid, partially cooling the solution and adding thereto 60 parts of a suitable solvent such as gasoline. A typical mix may include about 170 parts by weight of said binder, about 750 parts of comminuted asbestos, 90 parts of sulphur, 3 parts of coal tar oil, and 30 parts of gasoline as a solvent. Said ingredients are intimately mixed and the material thus formed is disintegrated and then re-balled (as by working or kneading the same in a so-called "pony" mixer) to increase the density thereof. Such material, either in granular or powder form or after treatment thereof to provide slugs or blanks of the character disclosed in my Patent No. 1,944,464, aforementioned, is dried out (as by a suitable heat treatment in an oven or the like) until the consistency after cooling to room temperature is some definite preselcted value.

Before pressing the aforementioned slugs or blanks are preheated (preferably in a small oven located adjacent to the molding die for the convenience of the die operator) and then quick-molded in a heated die. The small oven just mentioned and the molding die members may be heated as by means of suitable electric heating elements located or embedded therein, respectively;—such heating means being preferable to gas, steam or superheated steam heating arrangements. The temperature to which the slugs are preheated, the consistency of the latter and the temperaure to be maintained in the die members may be varied within rather wide limits. It is in general a matter of trial to find the best relationship to secure the somewhat critical point at which the pre-heated material and the heated dies co-act to utilize the best pressing qualities of the former whereby the highest degree of excellence of the finish is attained. After pressing the articles are subjected to the usual prolonged heat-treatment for curing and/or induration thereof. In general such heat-treatment may involve a gradual increase in oven temperature up to say, 400 degrees F., throughout a period of twenty to twenty-four hours, depending upon the size and shape of the molded articles and the particular characteristics of the molding material employed.

As a result of the aforedescribed methods of preparing, treating and molding such plastic insulating compositions I am enabled to obtain a uniformity in finish and quality of the molded and heat-indurated articles which is not possible with normal cold-molding. The prepared material after drying but before molding thereof is substantially unaffected by atmospheric conditions, whereas cold-moldable material as heretofore prepared is subject to continual change in the consistency and degree of plasticity thereof due to gradual evaporation of the volatile constituents and other changes incident to variations in ambient or room temperature. In like manner, in the usual cold-molding operations the die temperature changes according to the room temperature, whereas in my method involving semi-hot-molding the molding temperature is maintained substantially constant.

What I claim as new and desire to secure by Letters Patent is:

1. In the method of improving the surface finish of articles produced from a normally cold-moldable plastic insulating composition material comprising a fibrous filler and bituminous binder, the steps which consist in separately pre-heating the molding dies and the material, subjecting the latter to a quick-molding operation in the former to provide articles of the desired shape, and then removing said articles from the molds and subjecting the same to a prolonged heat-treatment for curing.

2. In the method of improving the surface finish of articles produced from a cold-moldable plastic insulating composition material comprising a fibrous filler and an asphaltic binder, the steps which consist in heat-treating the material to preparatorily remove certain volatile constituents thereof, then subjecting a charge of the material to a quick-molding operation between heated pressure dies to provide an article of the desired shape, removing the article from the mold cavity, and thereafter subjecting said article to a prolonged heat-induration treatment.

3. The method of treating a normally cold-moldable and heat-induratable plastic insulating composition comprising a mixture of fibrous filler and bituminous binder materials to improve the surface finish of articles produced therefrom, which comprises preparing a slug containing a measured quantity of the mixture to provide a mold charge, heat-treating the slug to remove a predetermined proportion of the volatile constituents of the mixture, subjecting the slug to a quick-molding operation between heated pressure dies to provide an article of the desired shape, and then subjecting the article to a prolonged heat-treatment after removal thereof from the dies.

4. The method of treating a cold-moldable and heat-induratable plastic insulating composition comprising a mixture of fibrous filler and asphaltic binder materials, which consists in extruding and blanking the mixture, heat-treating the blanks to remove certain volatile constituents of the mixture and to insure a given degree of plasticity and a given consistency of the latter, pre-heating the blanks to a given degree to temporarily increase the degree of plasticity thereof, subjecting said blanks while so heated to a quick-molding operation between pressure dies heated to a relatively higher degree than said blanks to provide articles of the desired shape, removing said articles from the dies, and then subjecting said articles to a prolonged heat-treatment at temperatures gradually increasing to about 400 degrees F. to effect induration thereof.

5. The method which comprises mixing and heating equal quantities of gilsonite and oleic acid, partially cooling the mixture and adding thereto a suitable solvent to provide a binder, intimately mixing with about 170 parts by weight of said binder, about 750 parts of fibrous filler material, 90 parts of sulphur, 3 parts of coal tar oil, and a suitable solvent, then disintegrating the material and treating the same to provide slugs of predetermined density, thereafter heat-treating the slugs to bring the material thereof to a given consistency whereby the same is substantially unaffected by variations in ambient temperature conditions, thereafter inserting the slugs into heated dies and quick-molding the same under heavy pressure into articles of the desired shape, and then subjecting the shaped articles to a prolonged heat-treatment for curing after removal thereof from the dies.

6. The method which comprises heating a quantity of stearin pitch, adding thereto an equal quantity of gilsonite and an equal quantity of oleic acid, partially cooling the solution and adding thereto a suitable solvent to provide a binder, intimately mixing with about 170 parts by weight of said binder, 750 parts of comminuted asbestos, 90 parts of sulphur, 3 parts of coal tar oil, and 30 parts of gasoline as a solvent, then disintegrating the material and re-balling the same to increase the density thereof, thereafter heat-treating the material to bring the same to a given consistency whereby the same is substantially unaffected by changes in ambient temperature conditions, inserting a charge of the material in a heated condition into a heated die and quick-molding the same into an article of the desired shape, and then subjecting the shaped article to substantially the usual prolonged heat-treatment for curing.

7. The method which comprises heating a quantity of stearin pitch, adding thereto like quantities each of gilsonite and oleic acid, partially cooling the solution and adding thereto a suitable solvent to provide a binder, intimately mixing with about 170 parts by weight of said binder about 750 parts of comminuted asbestos, 90 parts of sulphur, 3 parts of coal tar oil and 30 parts of gasoline as a solvent, then disintegrating the mixed material and re-balling, extruding and blanking the material to provide slugs of predetermined density and consistency, thereafter heat-treating said slugs to remove a predetermined proportion of the volatile constituents thereof and to render the same substantially inert with respect to variations in atmospheric temperature conditions, thereafter subjecting said slugs to a quick-hot-molding operation to provide articles of the desired shape, and then removing the articles from the molds and subjecting the same to a prolonged heat-treatment for curing.

8. In the method of improving the surface finish of articles produced from a non-sticking normally cold-moldable plastic insulating composition including a fibrous filler and a binder consisting of stearin pitch, gilsonite and oleic acid in substantially equal proportions, the steps which consist in pre-heating the molding material to a temperature substantially above the room temperature, heating the die members to a temperature substantially above the temperature of said material, subjecting the material to a quick-molding operation between said heated die members to provide an article of the desired shape, immediately removing the article from the die members, and then subjecting said article to a prolonged heat-treatment at a gradually increasing temperature up to 400 degrees F. to indurate and cure the same.

LINWOOD T. RICHARDSON.